(No Model.)

J. HEFFNER & A. E. DISHER.
ICE TONGS.

No. 525,076. Patented Aug. 28, 1894.

Witnesses
B. S. Ober
J. F. Riley

Inventors,
James Heffner
Anderson E. Disher

By their Attorneys.
C. A. Snow & Co.

UNITED STATES PATENT OFFICE.

JAMES HEFFNER AND ANDERSON E. DISHER, OF NEW WESTON, OHIO.

ICE-TONGS.

SPECIFICATION forming part of Letters Patent No. 525,076, dated August 28, 1894.

Application filed April 6, 1894. Serial No. 506,617. (No model.)

*To all whom it may concern:*

Be it known that we, JAMES HEFFNER and ANDERSON E. DISHER, citizens of the United States, residing at New Weston, in the county of Darke and State of Ohio, have invented new and useful Ice-Tongs, of which the following is a specification.

The invention relates to improvements in ice tongs.

The object of the present invention is to improve the construction of ice tongs, to increase their strength, durability, and efficiency, and to provide a pair capable of automatically opening and closing to release and engage a cake of ice.

The invention consists in the construction and novel combination and arrangement of parts, hereinafter fully described, illustrated in the accompanying drawings and pointed out in the claim hereto appended.

Figure 1:
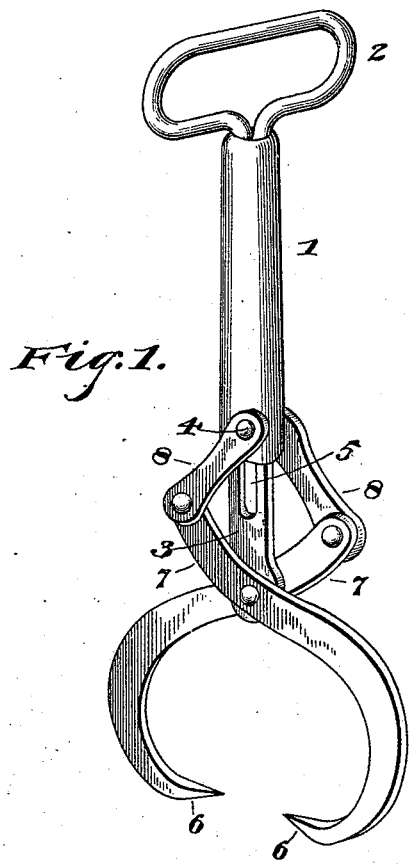
Figure 2:
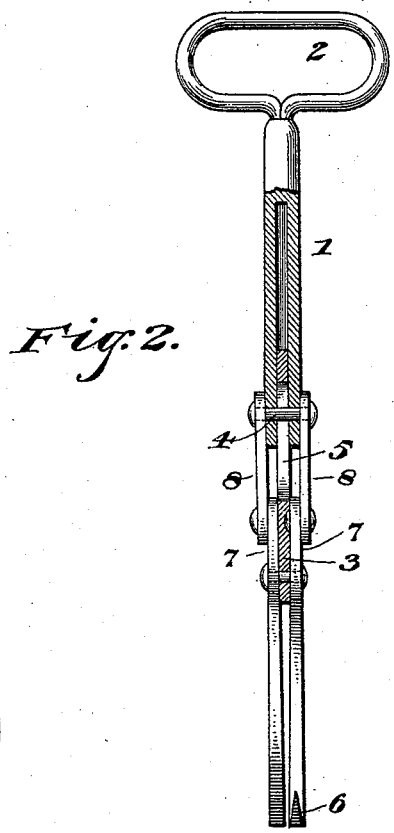

In the drawings—Figure 1 is a perspective view of a pair of ice tongs or hooks constructed in accordance with this invention. Fig. 2 is a longitudinal sectional view of the same.

Like numerals of reference indicate corresponding parts in both the figures of the drawings.

1 designates a tubular bar or shank provided at its upper end with a handle or grip 2, and having its lower end slightly flattened, and receiving a slotted bar 3 having a limited longitudinal movement in the tubular shank or bar. The longitudinal movement of the bar 3 is limited by a rivet 4, which passes through the lower end of the tubular shank and through the slot 5 of said bar; and the latter has pivoted to its lower end, which is slightly enlarged, at opposite sides thereof, a pair of hooks 6. The hooks 6 which are adapted to engage a cake of ice are of the usual form, and are provided at their lower ends with inwardly extending engaging points, and they have at their upper ends divergent arms 7, which are connected with the lower end of the shank by links 8. The hooks and their companion links are arranged at opposite sides of the bar 3 and the shank 1; a single bolt suffices for the attachment of the upper ends of the links and the bar 3 to the shank; and by arranging the parts in this manner the strain at the sides of the tongs is equalized, and the latter are prevented from any side twisting. The links and the arms of the hooks form a toggle connection, whereby, when the device is pushed downward against a cake of ice, the hooks will open, and as soon as the tongs are raised the hooks will close.

It will be seen that the tongs are simple and comparatively inexpensive in construction, that they possess great strength and durability, and that the hooks thereof are capable of opening and closing automatically.

Changes in the form, proportion, and the minor details of construction may be resorted to without departing from the principle or sacrificing any of the advantages of this invention.

What we claim is—

The combination of a tubular shank having its lower end slightly flattened and provided at its upper end with a grip or handle, the slotted bar pivoted for longitudinal movement in the shank, links arranged at opposite sides of the shank and the bar, the hooks arranged at opposite sides of the lower end of the bar and provided with arms pivotally connected to the lower ends of the links, and a pivot passing through the upper ends of the links and the shank and arranged in the slot of the bar, whereby the longitudinal movement of the latter is limited, substantially as described.

In testimony that we claim the foregoing as our own we have hereto affixed our signatures in the presence of two witnesses.

JAMES HEFFNER.
ANDERSON E. DISHER.

Witnesses:
GEORGE CRISLER,
LULU DISHER.